(12) United States Patent
Engle et al.

(10) Patent No.: US 11,402,227 B2
(45) Date of Patent: Aug. 2, 2022

(54) DYNAMIC ROUTE ADJUSTMENT

(71) Applicant: GM GLOBAL TECHNOLOGY OPERATIONS LLC, Detroit, MI (US)

(72) Inventors: Stephanie Olivia Engle, San Francisco, CA (US); Bradley David Ryan, San Francisco, CA (US); Kathryn Alexis Tuason, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 16/102,993

(22) Filed: Aug. 14, 2018

(65) Prior Publication Data
US 2020/0056901 A1    Feb. 20, 2020

(51) Int. Cl.
*G01C 21/34* (2006.01)
*G05D 1/00* (2006.01)

(52) U.S. Cl.
CPC ..... *G01C 21/3484* (2013.01); *G01C 21/3446* (2013.01); *G05D 1/0027* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 8,718,910 B2 | 5/2014 | Gueziec | |
| 9,244,462 B2 | 1/2016 | Pedersen | |
| 9,299,251 B2* | 3/2016 | Scofield | G08G 1/052 |
| 9,789,880 B2 | 10/2017 | Sweeney et al. | |
| 2009/0248587 A1* | 10/2009 | Van Buskirk | G06Q 10/063112 705/80 |
| 2015/0292894 A1* | 10/2015 | Goddard | G01C 21/3453 701/400 |
| 2017/0123422 A1* | 5/2017 | Kentley | B60L 15/20 |
| 2017/0126810 A1* | 5/2017 | Kentley | G06Q 50/30 |
| 2017/0132934 A1* | 5/2017 | Kentley | G08G 1/202 |
| 2017/0136842 A1 | 5/2017 | Anderson et al. | |
| 2017/0267256 A1* | 9/2017 | Minster | B60W 50/082 |
| 2017/0316696 A1* | 11/2017 | Bartel | G08G 1/202 |
| 2017/0370740 A1* | 12/2017 | Nagy | G01C 21/3484 |
| 2018/0052000 A1* | 2/2018 | Larner | B60W 30/025 |
| 2018/0304901 A1* | 10/2018 | Duan | G01C 21/3484 |
| 2018/0315146 A1* | 11/2018 | Matthiesen | G06Q 50/30 |

(Continued)

*Primary Examiner* — Peter D Nolan
*Assistant Examiner* — Demetra R Smith-Stewart
(74) *Attorney, Agent, or Firm* — Calfee, Halter & Griswold LLP (57) ABSTRACT

An autonomous vehicle including a vehicle propulsion system, a braking system, a steering system, and a computing system. The computing system includes a processor and memory that stores computer-executable instructions that cause the processor to select a route for a passenger of the autonomous vehicle for a trip to a destination. The route for the passenger is selected from a plurality of potential routes. The route for the passenger is selected based on a preference of the passenger and aggregate ride quality feedback from passengers of autonomous vehicles in a fleet at locations along the potential routes to the destination. The processor is further configured to control at least one of the vehicle propulsion system, the braking system, or the steering system to move the autonomous vehicle along the route as selected for the trip to the destination.

20 Claims, 8 Drawing Sheets

(56) References Cited

U.S. PATENT DOCUMENTS

| | | | |
|---|---|---|---|
| 2018/0322715 A1* | 11/2018 | Toyoda | G06N 20/00 |
| 2018/0365740 A1* | 12/2018 | Nix | B60W 60/0013 |
| 2019/0146508 A1* | 5/2019 | Dean | G05D 1/0274 |
| | | | 701/26 |
| 2019/0187706 A1* | 6/2019 | Zhou | B60W 30/18009 |
| 2019/0317512 A1* | 10/2019 | Zhang | G05D 1/0088 |
| 2019/0383621 A1* | 12/2019 | Isaacs | G01C 21/3484 |
| 2019/0383622 A1* | 12/2019 | Aich | G01C 21/3661 |
| 2019/0383623 A1* | 12/2019 | Aich | G01C 21/3423 |

* cited by examiner

DYNAMIC ROUTE ADJUSTMENT

BACKGROUND

An autonomous vehicle is a motorized vehicle that can operate without human conduction. The autonomous vehicle can be controlled to travel from an initial location (e.g., a pick-up location, a current geographic location) to a destination. The autonomous vehicle can access roadway information to determine a travel route from the initial location to the destination.

Conventionally, the travel route taken by the autonomous vehicle will be selected for expediency in reaching the destination, i.e. the fastest route. In some situations, however, the fastest route is not the ideal route for a person riding in the autonomous vehicle. For instance, in cases where a person is prone to motion sickness, the fastest route may subject a passenger to turns, elevation changes, and/or velocity changes that can lead to motion sickness. Moreover, since an autonomous vehicle lacks a human driver, the passenger is typically unable to convey information concerning the discomfort in a manner that allows for operation of the autonomous vehicle to be modified to mitigate the discomfort.

SUMMARY

The following is a brief summary of subject matter that is described in greater detail herein. This summary is not intended to be limiting as to scope of the claims.

In accordance with various aspects, provided is an autonomous vehicle. The autonomous vehicle includes a vehicle propulsion system, a braking system, a steering system, and a computing system that is in communication with the vehicle propulsion system, the braking system, and the steering system. The computing system includes a processor and memory that stores computer-executable instructions that, when executed by the processor, cause the processor to perform acts including selecting a route for a passenger of the autonomous vehicle for a trip to a destination in the autonomous vehicle. The route for the passenger is selected from a plurality of potential routes to the destination. The route for the passenger is selected based on a preference of the passenger and aggregate ride quality feedback from passengers of autonomous vehicles in a fleet at locations along the potential routes to the destination. The autonomous vehicle is in the fleet. The processor is further configured to perform acts including controlling at least one of the vehicle propulsion system, the braking system, or the steering system to move the autonomous vehicle along the route as selected for the trip to the destination.

Moreover, in accordance with various aspects, it is contemplated that the computing system can select the route for the passenger, from the plurality of potential routes, to the destination based on factors in addition to or instead of the aggregate ride quality feedback from the passengers of the autonomous vehicles in the fleet. Examples of other factors used by the computing system for selecting the route to the destination include elevation change rates along the potential routes, velocity change rates along the potential routes, and/or direction change rates along the potential routes. Further examples of the other factors that can additionally or alternatively used by the computing system for selecting the route to the destination include a number of direction changes above a threshold degree of directional change along the potential routes, a number of elevation changes above a threshold elevation change along the potential routes, and/or a number of velocity changes above a threshold velocity change along the potential routes.

In a further aspect, provided is a method for generating a supplement to roadway information. Ride quality feedback data can be received, at a processor (e.g., of a server computing system), from passengers of a fleet of autonomous vehicles as the autonomous vehicles traverse at least one roadway. The ride quality feedback data includes at least one of ride comfort data or data specifying scenic locations. Moreover, driving data can be received, at the processor, from the fleet of autonomous vehicles as the autonomous vehicles traverse the at least one roadway. The driving data can specify current states of the autonomous vehicles at times corresponding to the ride quality feedback data. Further, the ride quality feedback data from the passengers and the driving data from the autonomous vehicle can be aggregated by the processor. Roadway information can be supplemented with the aggregated ride quality feedback data and the aggregated driving data. The roadway information is stored in a memory associated with the processor.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to dynamically adjusting a route of an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

While selecting a route for an autonomous vehicle it is important to focus on rider experience while traversing the route. Conventionally that meant focusing on taking the fastest route possible. However, it may also be important to focus on minimizing potential uncomfortableness for the rider caused by the autonomous vehicle traversing a route. The disclosed techniques allow a user to indicate that the current route is causing discomfort; thus, the autonomous vehicle can dynamically adjust the route to minimize the uncomfortableness (e.g., a new route may or may not be the fastest route to the destination). The disclosed techniques may additionally select a route based on rider preferences (e.g., less turns, slower, a route for someone prone to motion sickness, scenic route, etc.).

Figure 1:
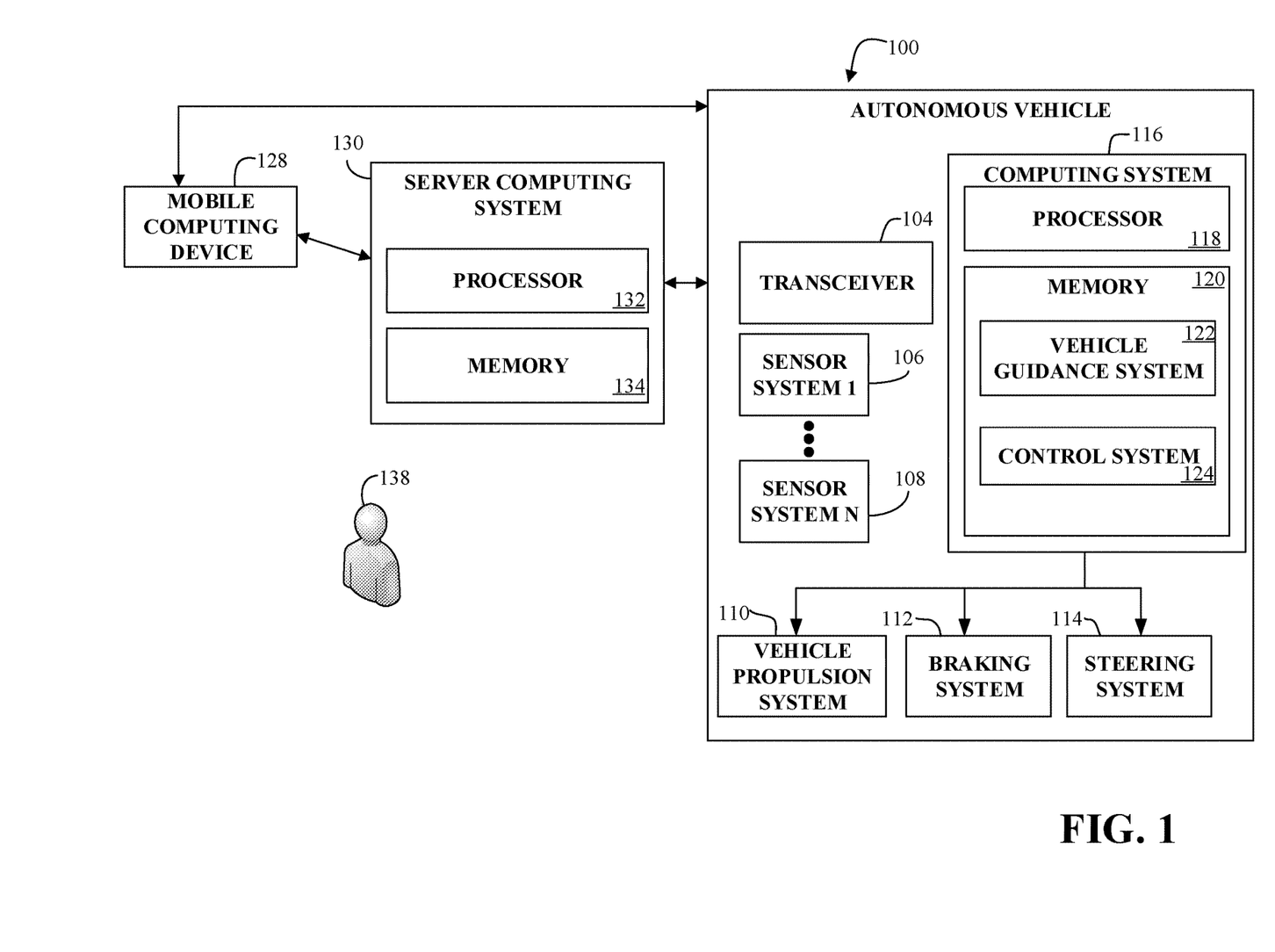
FIG. 1 illustrates an exemplary autonomous vehicle.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 106 and 108 (a first sensor system 106 through an Nth sensor system 108). The sensor systems 106 and 108 may be of different types and may be arranged about the autonomous vehicle 100. For example, the first sensor system 106 may be a lidar sensor system and the Nth sensor system 108 may be a camera (image) system. Other exemplary sensor systems include radar sensor systems, GPS sensor systems, sonar sensor systems, infrared sensor systems, and the like.

The autonomous vehicle 100 can also be in network communication with a server computing system 130 (or a plurality of server computing systems) and/or a mobile computing device 128 (or a plurality of mobile computing devices). For instance, the autonomous vehicle 100 can include a transceiver 104 configured to transmit data from the autonomous vehicle 100 and/or receive data at the autonomous vehicle 100. Thus, the autonomous vehicle 100 can exchange data with the server computing system 130 and/or the mobile computing device 128 via the transceiver 104.

The autonomous vehicle 100 includes several mechanical systems that are used to effectuate appropriate motion of the autonomous vehicle 100. For instance, the mechanical systems can include, but are not limited to, a vehicle propulsion system 110, a braking system 112, and a steering system 114. The vehicle propulsion system 110 may be an electric motor, an internal combustion engine, a combination thereof, or the like. The braking system 112 can include an engine brake, brake pads, actuators, and/or any other suitable componentry that is configured to assist in decelerating the autonomous vehicle 100. The steering system 114 includes suitable componentry that is configured to control the direction of the movement of the autonomous vehicle 100.

The autonomous vehicle 100 additionally includes a computing system 116 that is in communication with the transceiver 104, the sensor systems 106-108, the vehicle propulsion system 110, the braking system 112, or the steering system 114. The computing system 116 includes at least one processor 118 and memory 120 that includes computer-executable instructions that are executed by the processor 118. In an example, the processor 118 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FGPA), or the like.

The memory 120 includes a vehicle guidance system 122 that may be configured to select a route from an initial location to a destination. The initial location can be a pick-up location (e.g., a geographic location at which a passenger 138 is picked up or to be picked up by the autonomous vehicle 100) and/or a current geographic location of the autonomous vehicle 100. The memory 118 additionally includes a control system 124 that is configured to receive an output of the vehicle guidance system 122 and is further configured to control at least one of the mechanical systems (the vehicle propulsion system 110, the braking system 112, and/or the steering system 114) based upon the output of the vehicle guidance system 122. Thus, the control system 124 can control the mechanical system(s) of the autonomous vehicle 100 to move the autonomous vehicle 100 along the route as selected by the vehicle guidance system 122 for a trip to the destination.

Figure 2:
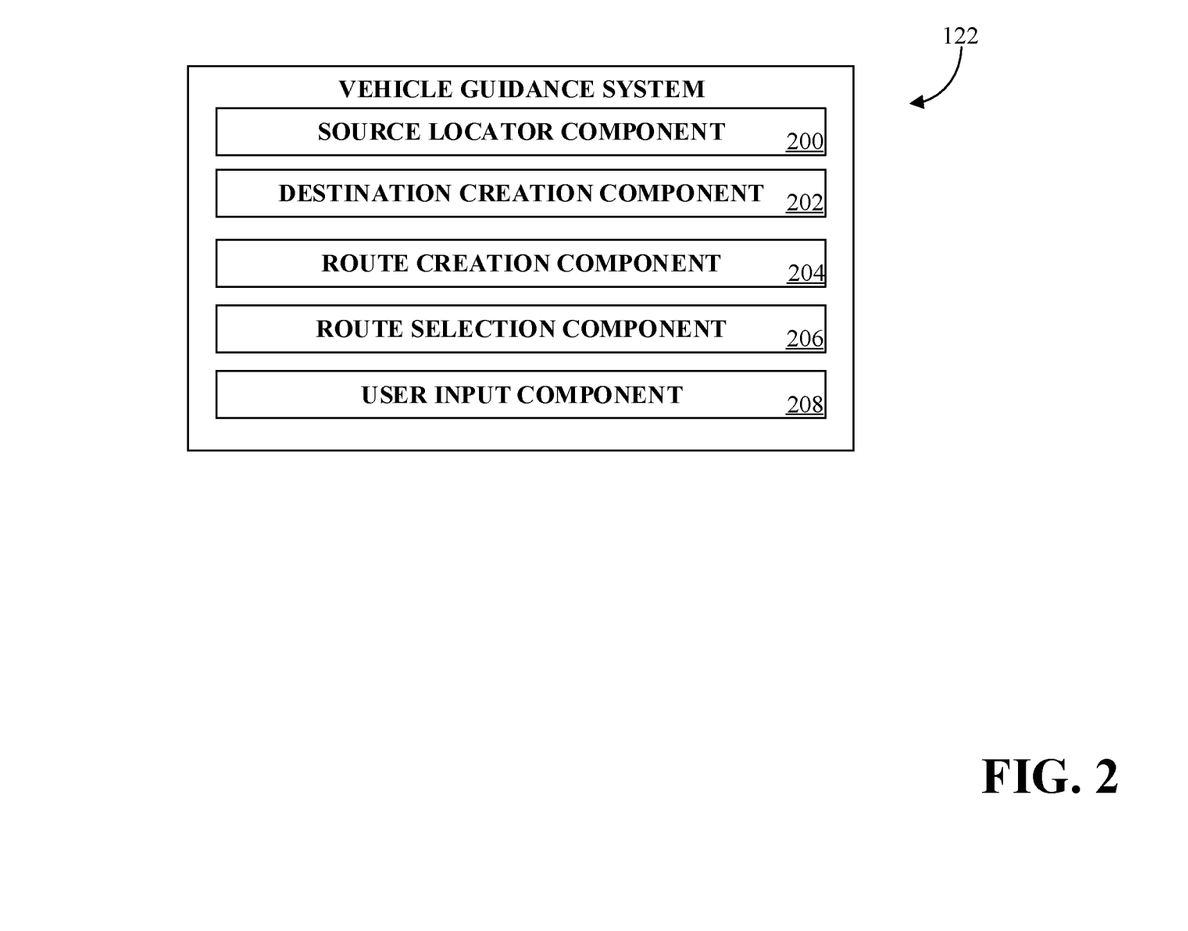
FIG. 2 is a functional block diagram of an exemplary vehicle guidance system.

As shown in FIG. 2, the vehicle guidance system 122 may include a source locator component 200, a destination creation component 202, a route creation component 204, a route selection component 206, and/or a user input component 208.

The source locator component 200 is configured to determine a geolocation of the autonomous vehicle 100. The geolocation of the autonomous vehicle 100 may be determined based on the sensor systems 106 and 108 arranged about the autonomous vehicle 100. Any system capable of determining a geolocation of the autonomous vehicle 100 is considered.

The destination creation component 202 is configured to receive data specifying the destination for the passenger 138 of the autonomous vehicle 100. The destination creation component 202 sets the geolocation of the destination as an end point of a route to be selected. For instance, the data specifying the destination for the passenger 138 may be received when the passenger 138 hails the autonomous vehicle 100. By way of illustration, the passenger 138 may input the destination into the mobile computing device 128. The data specifying the destination for the passenger 138, for example, can be transmitted from the mobile computing device 128 to the autonomous vehicle 100 (e.g., directly via a short-range communication component 306 of the mobile computing device 128, via the server computing system 130).

The route creation component 204 is configured to calculate at least one route from the initial location to the destination. The computing system 116 may calculate the at least one route by accessing roadway information (e.g., maintained by the server computing system 130) to obtain roadways to plot at least one route from the initial location to the destination. The roadway information may be supplemented by or created via crowdsourced information, discussed in detail further below, from at least one mobile computing device, preferably a plurality of mobile computing devices. The crowdsourced information may include traffic incidents, roadway(s) that have caused motion sickness, hills, congested areas for pick-up and/or drop-off, landmarks, sights of interest, or any other desired information. The crowdsourced information may provide real time, up-to-date, street level traffic information.

The route selection component 206 is configured to select a route for the autonomous vehicle 100. The route selection component 206 can select the route from a list of at least one potential route calculated by the autonomous vehicle 100 via the route creation component 204 and/or the server computing system 130.

The route selection component 206 may select the route for the passenger 138 of the autonomous vehicle 100 from the list of at least one potential route based on at least one of a preference of the passenger 138; aggregate ride quality feedback from passengers of autonomous vehicles in a fleet at locations along the at least one potential route; elevation change rates along the at least one potential route; velocity change rates along the at least one potential route; or direction change rates along the at least one potential route. Additionally or alternatively, the route selection component 206 may select the route for the passenger 138 of the autonomous vehicle 100 from the list of at least one potential route based on at least one of a number of direction changes above a threshold degree of directional change along the at least one potential route; a number of elevation changes above a threshold elevation change along the at least one potential route; or a number of velocity changes above a threshold velocity change along the at least one potential route.

The elevation change rate is the change in height or elevation as a function of distance (i.e. $\Delta h/\Delta d$). A large elevation change over a short distance will have a larger elevation change rate than the same elevation change over a longer distance.

The velocity change rate is the difference between an initial velocity and a final velocity as a function of distance (i.e. $\Delta v/\Delta d$). For example, a "hard stop" by the autonomous vehicle 100 would have a high velocity change rate because of the large change in velocity over a short distance.

The direction change rate is the change in directional degree as a function of distance (i.e. $\Delta \theta/\Delta d$). For example, a directional change of 90° will have a higher rate than a directional change of <90° over the same distance.

According to an example, the route selection component 206 may select the route for the passenger 138 to minimize the number of direction changes above the threshold degree of directional change along the potential routes. In another example, the route selection component 206 may select the route for the passenger 138 to minimize the number of elevation changes above the threshold elevation change along the potential routes. In a further embodiment, the route selection component 206 may select the route for the passenger 138 to minimize the number of velocity changes above the threshold velocity change along the potential routes. In a yet further embodiment, the route selection component 206 may select the route for the passenger 138 to minimize a combination of the foregoing along the potential routes.

In one embodiment, the preference of the passenger 138 can be to select a route as a function of ride comfort. In this embodiment, the aggregate ride quality feedback from passengers of autonomous vehicles in the fleet at the locations along the at least one potential route includes ride comfort data reported by the passengers of the autonomous vehicles in the fleet at the locations.

The ride comfort data may include information signifying that the location results in a passenger experiencing discomfort (e.g., motion sickness, dizziness, fatigue, pain, nausea, trauma, etc.). For example, there is a likelihood of experiencing motion sickness symptoms, including nausea and dizziness, if a passenger in an autonomous vehicle is exposed to lateral disturbances and/or vertical oscillations caused by swerving, sharp turns, fast changes in elevation, potholes, or the like. Because the comfort of ride can be subjective, the system is designed to aggregate ride comfort data from a plurality of passengers in a fleet of autonomous vehicles so as to provide a more objective information about the comfort level for a location.

In another embodiment, the preference of the passenger 138 is to select a route as a function of scenery. In this embodiment, the aggregate ride quality feedback from passengers of autonomous vehicles in the fleet at the locations along the at least one potential route includes data specifying scenic locations reported by the passengers of the autonomous vehicles in the fleet at the locations.

The scenic locations reported by the passengers may include landmarks (e.g., parks, monuments, statues, etc.), buildings (e.g., skyscrapers, sports arenas, etc.), structures (e.g., bridges, water towers, etc.), scenic views, or the like. For example, a passenger of an autonomous vehicle in the fleet can send data specifying a scenic view of a coast along a location of the road.

A passenger may have a preference for selecting a route as a function of scenery when they are not familiar with an area and wish to see what passengers familiar with the area consider scenic. A passenger may also have a preference for selecting a route as a function of scenery when speed reaching the destination is not a priority, so the passenger prefers to take a scenic route to the destination.

It is hereby contemplated that the different scenic locations may be classified into respective groups. The passenger 138 can then set a preference for a specific type of scenic location (e.g., buildings, monuments, scenic views, etc.) and the preferred scenic location type will be prioritized when selecting the route. For example the passenger 138 can set a preference for landmarks or can set a preference for scenic views.

In a yet further embodiment, the preference of the passenger 138 is to select a route as a function of ease of entering and exiting the autonomous vehicle 100. In this embodiment, the aggregate ride quality feedback from passengers of autonomous vehicles in the fleet at the locations along the at least one potential route includes ease data concerning entering the autonomous vehicles in the fleet at pick-up locations or exiting the autonomous vehicles in the fleet at the destinations reported by the passengers of the autonomous vehicles in the fleet at the locations.

The ease data may include information signifying that the pick-up or drop-off location results in difficulty entering or exiting the autonomous vehicle. For example, the pick-up or drop-off location could be on an incline making it difficult for the passenger 138 to exit the autonomous vehicle 100 because of the potential for the passenger 138 to fall either forward or backward because of the incline. In another example, the drop-off may be late at night; following this example, it is conducive for the drop-off location to be as close to the destination as feasible.

Alternatively, the passenger 138 may have characteristics (e.g., age, gender, accessibility concerns, etc.) that make it conducive for the pick-up or drop-off location to be as close the destination as feasible. For example, if the passenger 138 is a child, it may be conducive for them to be dropped off as close to the destination as possible to make the trip from the autonomous vehicle 100 to the destination as easy as possible. In another example, if the passenger 138 is elderly or has a disability, it may be conducive to place the pick-up or drop-off location as close as possible. Accordingly, the pick-up and/or drop-off location can be adjusted based on the foregoing.

Figure 4:
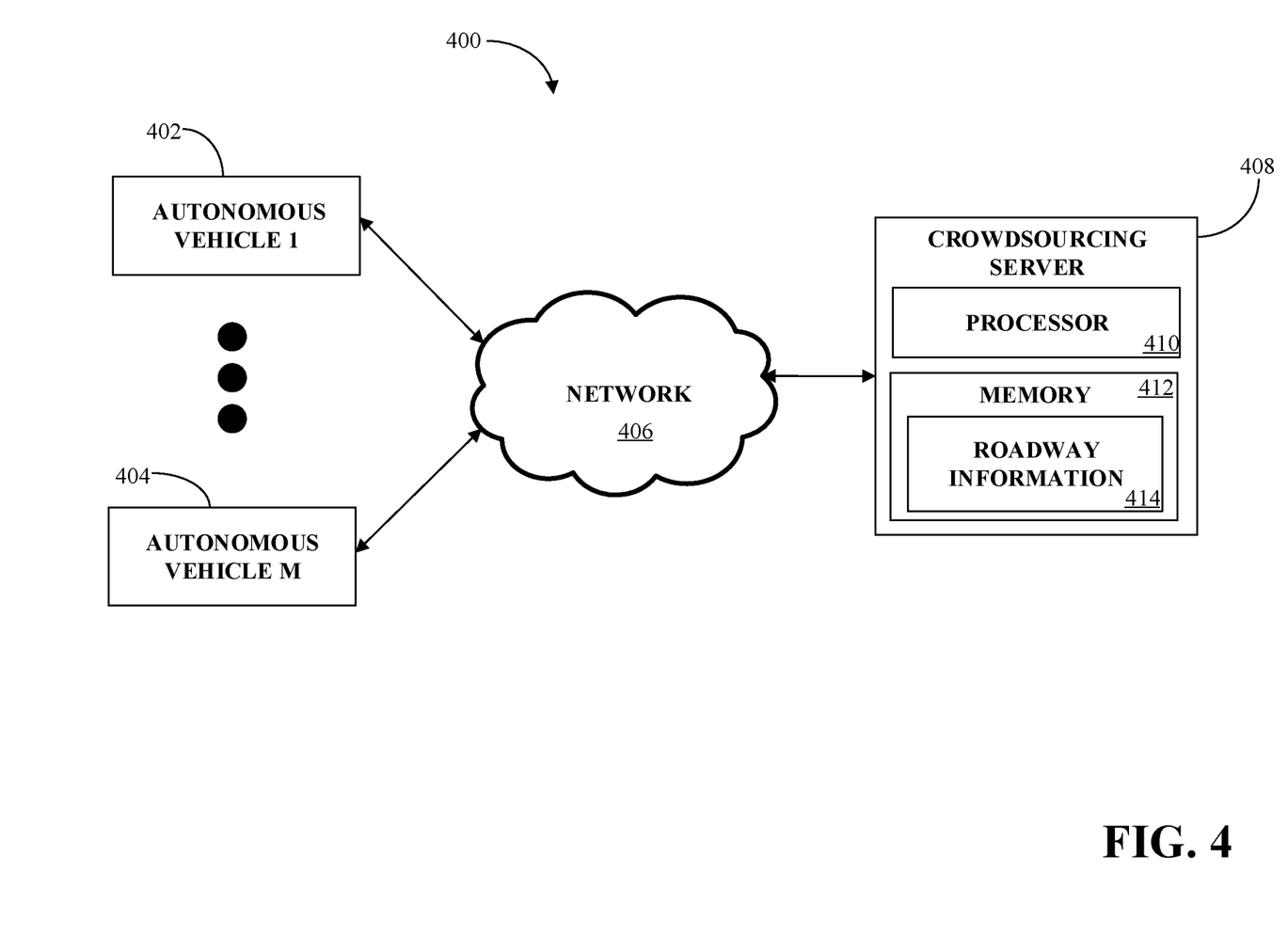
FIG. 4 illustrates an exemplary shared mobile computing device system.

Turning to FIG. 4, illustrated is an example embodiment of a system 400 configured to collect and aggregate ride quality feedback data from the fleet. The autonomous vehicle 100 may be included in the fleet. The system 400 may include a crowdsourcing server 408 and a plurality of autonomous vehicles 402 and 404 comprising the fleet (a first autonomous vehicle 402 through an Mth autonomous vehicle 404). For instance, the server computing system 130 of FIG. 1 may be or include the crowdsourcing server 408. The passengers in the plurality of autonomous vehicles 402 and 404 wirelessly communicate with the crowdsourcing server 408 through a network 406, such as a cellular telephone network, satellite network, Wi-Fi network, etc. The crowdsourcing server 408 may include a processor 410 and a memory 412 associated with the processor 410. The memory may include the roadway information 414 used by the autonomous vehicle 100 to calculate a route for the autonomous vehicle 100.

The crowdsourcing server 408 is configured to collect the ride quality feedback data along with driving data associated with the ride quality feedback data. The ride quality feedback data may include ride comfort data, data specifying scenic locations, data specifying ease data entering and exiting the autonomous vehicle, or any desired feedback information. The driving data may include a current state of the autonomous vehicles 402 and 404 at the time at least one piece of the ride quality feedback data is transmitted. The current state of the autonomous vehicles 402 and 404 may include a current geolocation, direction, velocity, elevation, or the like.

The crowdsourcing server 408 may be further configured to assign location and chronological information associated with the at least one piece of ride quality feedback data. The location for the at least one piece of ride quality feedback data may be determined by the associated driving data.

The crowdsourcing server 408 is configured to aggregate the ride quality feedback data from the passengers and the driving data from the autonomous vehicles 402 and 404. The crowdsourcing server 408 may be configured to supplement the roadway information 414 with the aggregated ride quality feedback data or the aggregated driving data. The supplemented roadway information can then be filtered based on the ride quality feedback data. For example, the supplemented roadway information 414 can be filtered to show roadway information supplemented only with ride comfort data.

Returning to FIG. 2, the user input component 208 is configured to receive an input specifying a preference of the passenger 138 and responsive to the input select a route for the autonomous vehicle 100. In one embodiment, the user input is a route change request signifying discomfort of the passenger 138 as the autonomous vehicle 100 traverses a selected route. Responsive to the route change request, the vehicle guidance system 122 switches from the selected route for the passenger 138 of the autonomous vehicle 100 to a route selected in response to receipt of the route change request.

In another embodiment, the user input is a selection of a route from a list of potential routes. The passenger 138 may select the route via the mobile computing device 128 or via the autonomous vehicle 100. For example, referring briefly to FIG. 3, the mobile computing device 128 includes a touchscreen display 314 with graphical features 316 configured to display the list of potential routes. The passenger 138 can select from the list of potential routes by accessing the touchscreen display 314. The mobile computing device 128 may also include input components 304 configured to allow the passenger 138 to enter inputs to select from the at least one calculated route.

In one embodiment, the user input is a selection of a route suggested by a third party. In this embodiment, the suggested route includes a location suggested by the third party along the suggested route. The location suggested by the third party can be based on different factors including, but not limited to, time of day, destination, identity factors of the passenger 138 (e.g., age, gender, employment), a previously selected suggested route, etc. The suggested route may be displayed as an alert operable by the passenger 138 to select the suggested route. For example, in the morning the passenger 138 sets the destination as his or her place of employment, the route suggested by the third party may include passing by a coffee shop in an effort to entice the passenger 138 to buy a coffee from the coffee shop.

In a yet further embodiment, the user input is a selection of a destination suggested by a third party. The destination suggestion can be based on different factors including, but not limited to, time of day, destination, identity factors of the passenger 138 (e.g., age, gender, employment), previously selected suggested route, proximity to the passenger 138, etc.

In this embodiment, the suggested destination can be displayed as an alert operable by the passenger 138 to select the suggested destination. For example, the alert can include text stating "You are twenty blocks from Central Park, would you like to set this as the destination?"

For the embodiments described above, the third party may include a sponsor and/or advertiser. The sponsor and/or advertiser can partially or fully subsidize the cost of the suggested route or destination shown to the passenger 138. In a version of this embodiment, where the route or destination is suggested by a sponsor and/or advertiser, if the passenger 138 selects the suggested route or destination the route may have a discounted cost. The suggested route is configured to take the passenger 138 past a suggested location en route to a destination set by the passenger 138. The suggested route need not be the most expedient route from a list of potential routes from a pick-up location to the destination chosen by the passenger.

The sponsor and/or advertiser may pay in advance for the system to make these suggestions. The sponsor and/or advertiser can pay for a location to be a suggested destination and/or can pay to have suggested routes go past a location. For example, a coffee shop can pay to have a suggestion made and the system suggests at least one route that takes a passenger of an autonomous vehicle past the coffee shop. In another example, a store can pay to have a suggestion made and the system suggests as a destination the store.

The sponsor and/or advertiser may further offer to partially or fully subsidize a cost charged to a passenger for taking an autonomous vehicle to the suggested destination and/or along the suggested route. Therefore, a passenger may be shown a reduced route cost associated with the suggestion because it is sponsored by the sponsor and/or advertiser. For example, a passenger is shown the suggested route past the coffee shop of the prior example and a reduced route cost because the route is sponsored by the coffee shop. In another example, a passenger is shown the suggested destination of the store of the prior example and a reduced route cost because the destination is sponsored by the store.

Figure 3:
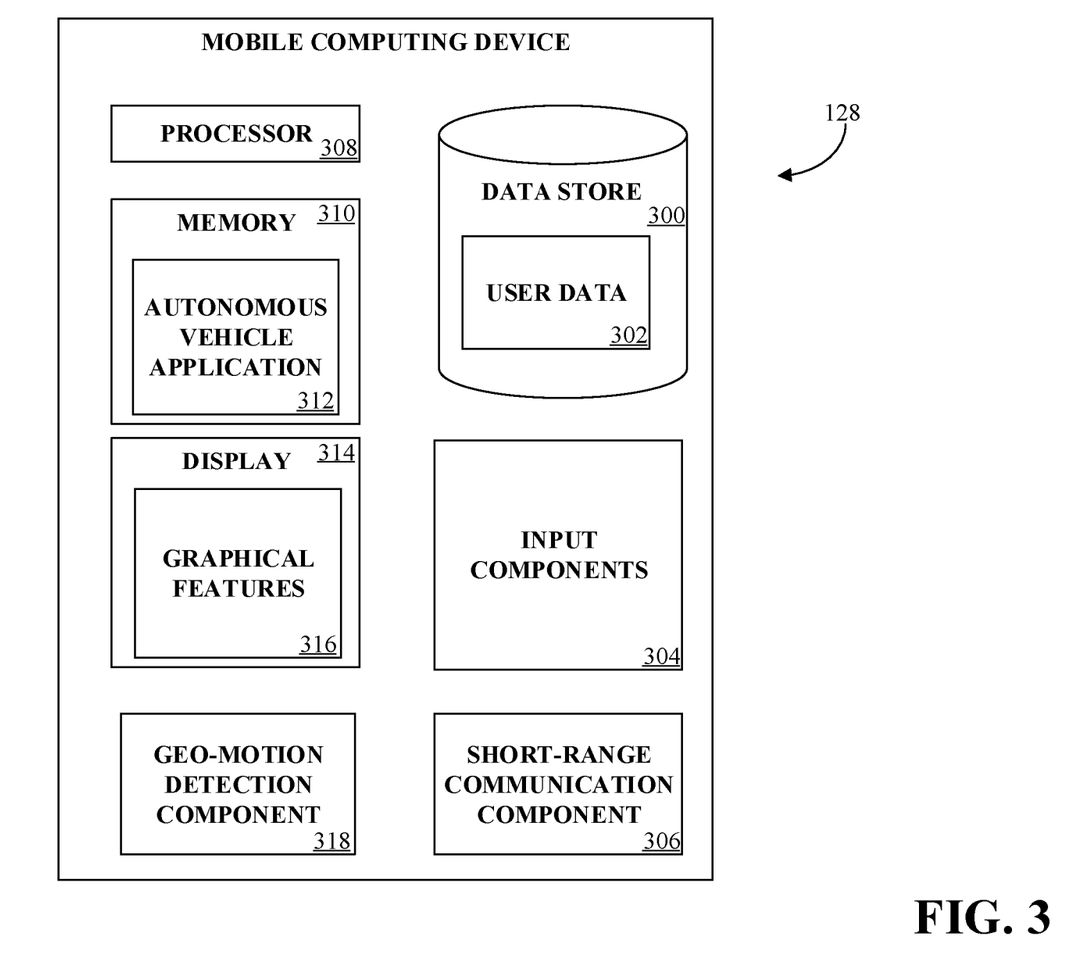
FIG. 3 illustrates an exemplary mobile computing device.

With reference now to FIG. 3, a functional block diagram of the mobile computing device 128 is illustrated. The mobile computing device 128 includes a processor 308 and memory 310, wherein the memory 310 has an autonomous vehicle application 312 loaded therein. As will be described in greater detail below, the autonomous vehicle application 312 may be configured to interface with the server computing system 130 or to interface with the autonomous vehicle 100.

The mobile computing device 128 may include a data store 300 which may include user data 302. The user data 302 may include at least one of identification data regarding the passenger 138, passenger preferences, identification data regarding the mobile computing device 128 itself, or the like.

The mobile computing device 128 may include a display 314, whereupon graphical features 316 may be presented. For instance, a GUI for the autonomous vehicle application 312 may be presented as part of the graphical features 316. The mobile computing device 128 may include input components 304 suitable for data input (e.g., touchscreen, mouse, keyboard, trackpad, trackwheel, video camera, microphone, etc.).

The mobile computing device 128 may additionally include geo-motion detection component 318 and a short-range communication component 306. The geo-motion detection component 318 may include an assisted GPS receiver that has an accuracy of 1-50 cm. The short-range communication component 306 may be a near field communication (NFC) receiver or a Bluetooth chip. In an embodiment, the short-range communication component 306 may be employed by the autonomous vehicle application 312 to pair the mobile computing device 128 with the autonomous vehicle 100. For instance, the autonomous vehicle 100 may have a short-range communication component installed therein which can communicate with the short-range communication component 306 in order to pair the mobile computing device 128 and the autonomous vehicle 100.

Returning to FIG. 1, as discussed above, the mobile computing device may be in direct communication with the autonomous vehicle 100. In another embodiment, shown in FIG. 1, the mobile computing device 128 may be in communication with the autonomous vehicle 100 through an intermediary, such as the server computing system 130. The server computing system 130 may include at least one processor 132 and memory 134 that includes computer-executable instructions that are executed by the processor. The server computing system 130 may be configured to transmit information from the mobile computing device 128 to the autonomous vehicle 100 or from the autonomous vehicle 100 to the mobile computing device 128.

FIGS. 5-8 illustrate exemplary methodologies relating to controlling an autonomous vehicle based on output from a mobile computing device. While the methodologies are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Figure 5:
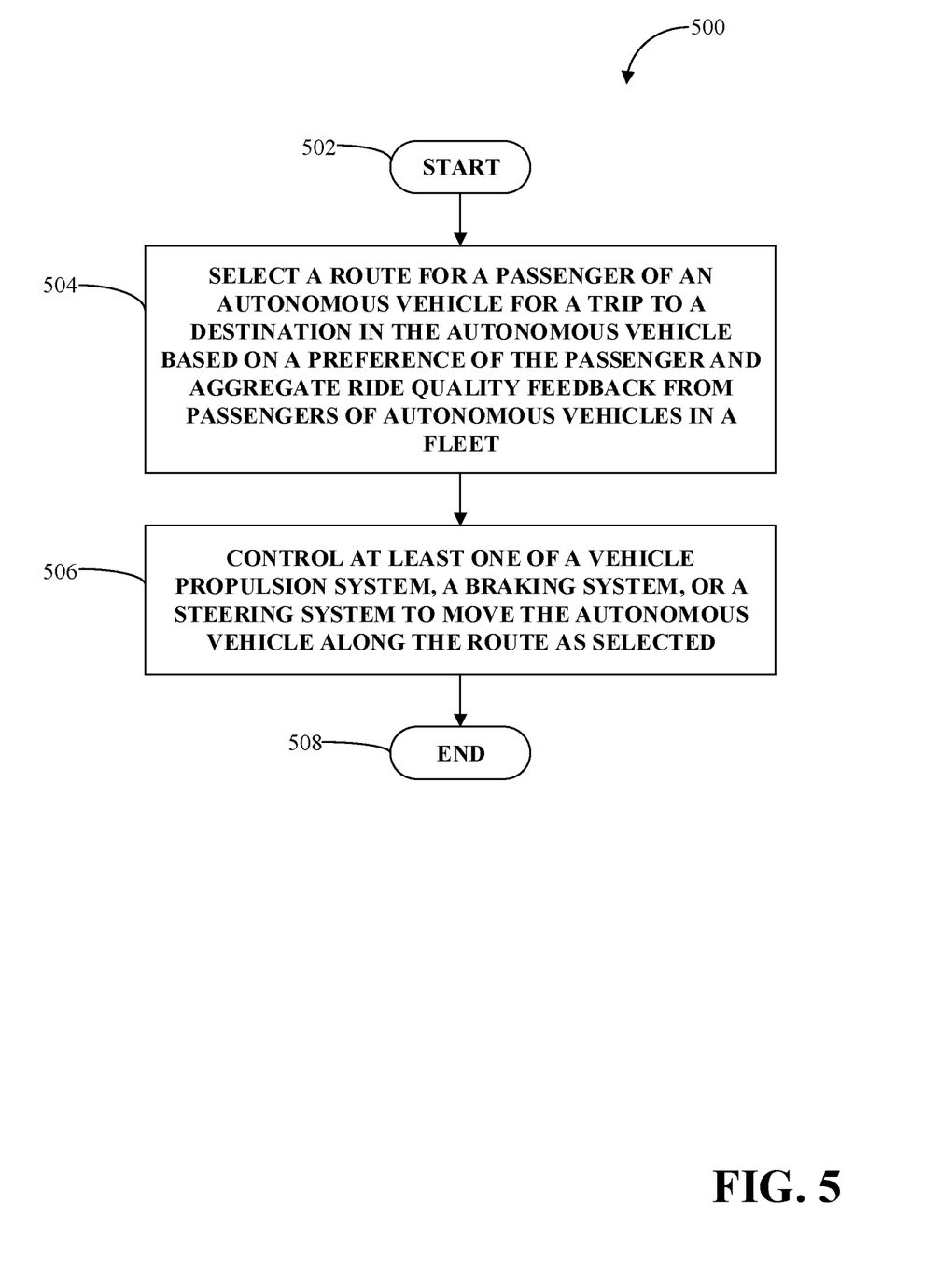
FIG. 5 is a flow diagram that illustrates an exemplary methodology executed by an autonomous vehicle computing system that facilitates movement of the autonomous vehicle.

Referring now to FIG. 5, an exemplary methodology 500 for controlling operation of an autonomous vehicle is illustrated. The methodology 500 starts at 502, and at 504 a processor in the autonomous vehicle selects a route for a passenger of the autonomous vehicle for a trip to a destination in the autonomous vehicle. The route for the passenger is selected from a plurality of potential routes to the destination. The route for the passenger is selected based on a preference of the passenger and aggregate ride quality feedback from passengers of autonomous vehicles in a fleet at locations along the potential routes to the destination. The autonomous vehicle may be in the fleet. At 506, the autonomous vehicle is operated by controlling at least one of a vehicle propulsion system, a braking system, or a steering system to move the autonomous vehicle along the route as selected for the trip to the destination. The methodology 500 concludes at 508.

In one embodiment, the route for the passenger is further selected based on elevation change rates along the potential routes. In another embodiment, the route for the passenger is further selected based on velocity change rates along the potential routes. In a yet further embodiment, the route for the passenger is further selected based on direction change rates along the potential routes.

In an embodiment, the preference of the passenger is to select the route as a function of ride comfort. In this embodiment, the aggregate ride quality feedback from the passengers of the autonomous vehicles in the fleet at the locations along the potential routes includes ride comfort data reported by the passengers of the autonomous vehicles in the fleet at the locations. In another embodiment, the preference of the passenger is to select the route as a function of scenery. In this embodiment, the aggregate ride quality feedback from the passengers of the autonomous vehicles in the fleet at the locations along the potential routes includes data specifying scenic positions reported by the passengers of the autonomous vehicles in the fleet at the locations. In a further embodiment, the preference of the passenger is to select the route as a function of ease entering and exiting the autonomous vehicle. In this embodiment, the aggregate ride quality feedback from the passengers of the autonomous vehicles at the locations along the potential routes includes ease data entering the autonomous vehicle at a pick-up location and exiting the autonomous vehicle at the destination reported by the passengers of the autonomous vehicles.

In an embodiment, the methodology 500 further includes receiving user input specifying the preference of the passenger. The route for the passenger is then selected responsive to receipt of the user input specifying the preference of the passenger. In one version of this embodiment, the user input specifying the preference of the passenger includes a route change request, wherein the route change request signifies discomfort of the passenger of the autonomous vehicle as the autonomous vehicle traverses a selected route. Selecting the route for the passenger includes switching from the selected route for the passenger of the autonomous vehicle for the trip to the destination to the route selected in response to receipt of the route change request. In another version of this embodiment, the user input specifying the preference of the passenger is a route suggested by a third party. In this version, the suggested route includes a location suggested by the third party along the suggested route. In a yet further version of this embodiment, the user input specifying the passenger is selection of a destination suggested by a third party.

Figure 6:
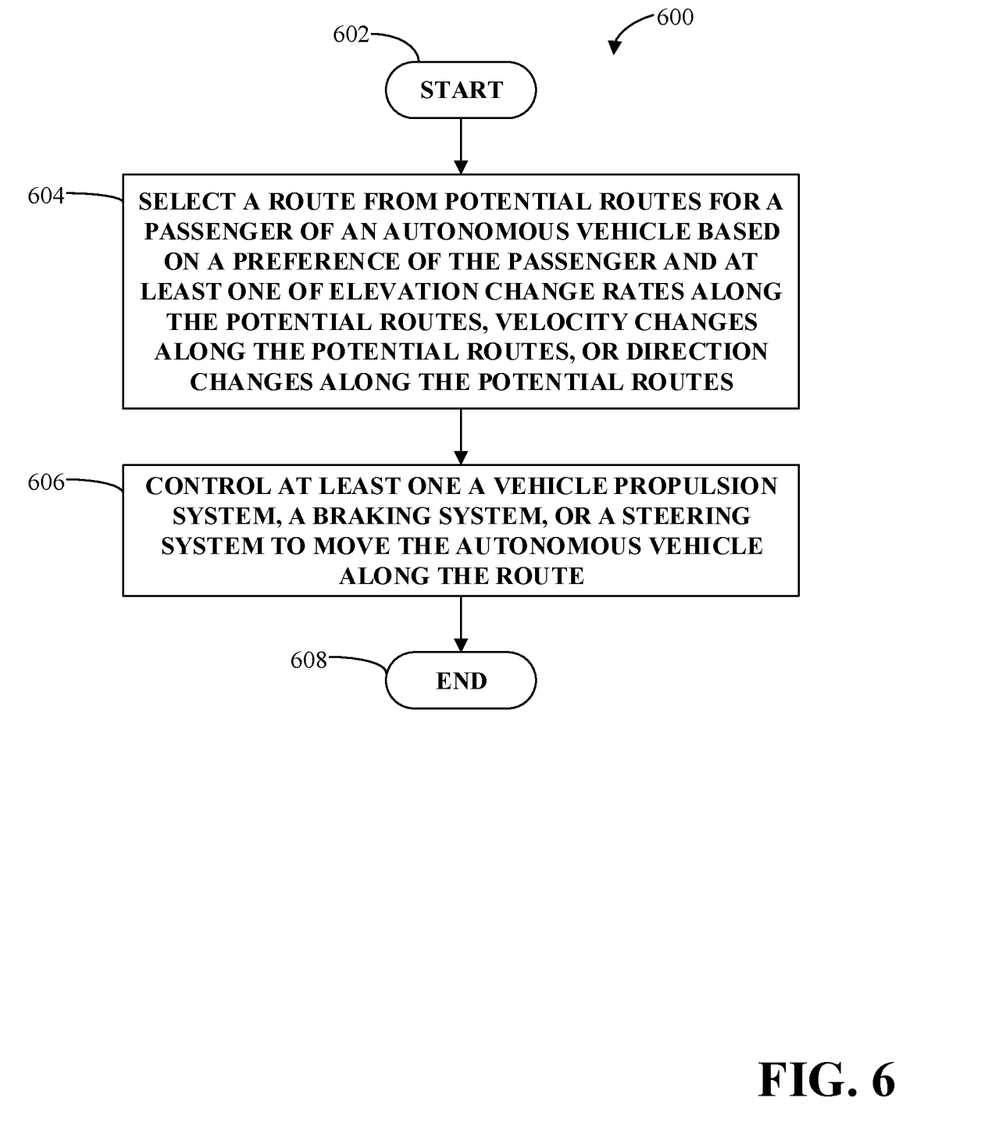
FIG. 6 is a flow diagram that illustrates an exemplary methodology executed by an autonomous vehicle computing system that facilitates movement of the autonomous vehicle.

Referring now to FIG. 6, an exemplary methodology 600 for controlling operation of an autonomous vehicle is illustrated. The methodology 600 starts at 602, and at 604 a route is selected for a passenger of the autonomous vehicle for a trip to the destination in the autonomous vehicle. The route for the passenger is selected from a plurality of potential routes to the destination. The route for the passenger may be selected based on a preference of the passenger and at least one of elevation change rates along the potential routes, velocity change rates along the potential routes, or direction change rates along the potential routes. At 606, the autonomous vehicle is operated by controlling at least one of a vehicle propulsion system, a braking system, or a steering system to move the autonomous vehicle along the route. The methodology concludes at 608.

In one embodiment, the route is selected based on a number of direction changes above a threshold degree of directional change along the potential route. In another embodiment, the route is selected based on a number of elevation changes above a threshold elevation change along the potential routes. In another embodiment, the route is selected based on a number of velocity changes above a threshold velocity change along the potential routes.

In one embodiment, the preference of the passenger is to select a route as a function of comfort. In this embodiment, comfort is based on ride comfort data reported by passengers of autonomous vehicles in a fleet at locations along the potential routes. In another embodiment, the preference of the passenger is to select a route as a function of scenery. In this embodiment, scenery is based on data specifying scenic locations reported by passengers of autonomous vehicles in a fleet at locations along the potential routes.

In yet another embodiment, the methodology 600 further includes the step of receiving user input specifying the preference of the passenger. The route for the passenger is selected responsive to receipt of the user input specifying the preference of the passenger Referring now to FIG. 7, an exemplary methodology 700 for generating a supplement to roadway information is illustrated. The methodology 700 starts at 702, and at 704 a processor receives ride quality feedback data from passengers of a fleet of autonomous vehicles as the autonomous vehicles traverse at least one roadway. The ride quality feedback data may include at least one of ride comfort data, data specifying scenic locations, or data specifying ease entering or exiting the autonomous vehicle. At 706, the processor receives driving data from the fleet of autonomous vehicles (e.g., collected by autonomous vehicle in the fleet) as the autonomous vehicles traverse the at least one roadway. The driving data may specify current states of the autonomous vehicles at times corresponding to the ride quality feedback data.

Figure 7:
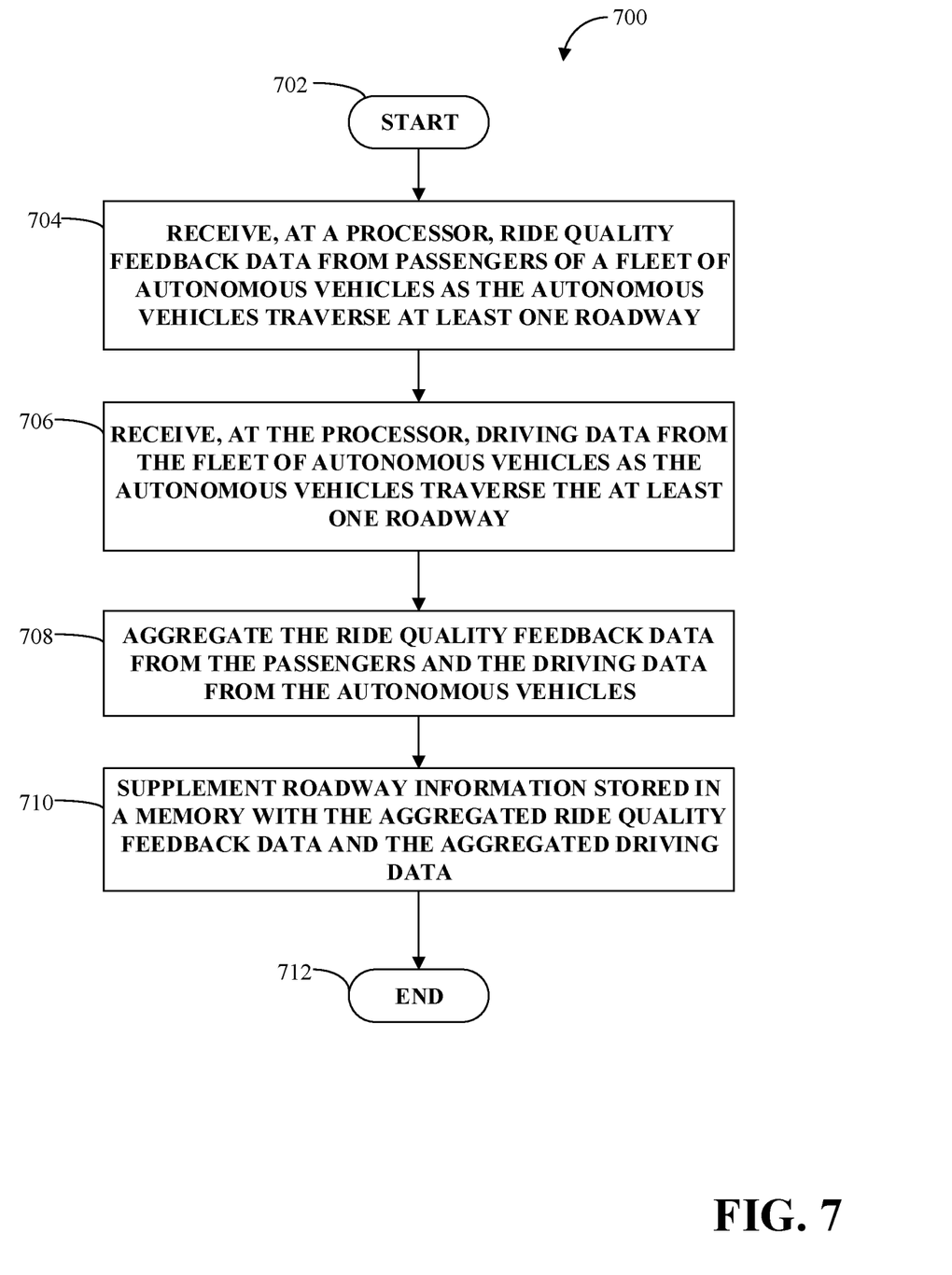
FIG. 7 is a flow diagram that illustrates an exemplary methodology executed by a crowdsourcing server that facilitates supplementing roadway information with aggregated feedback data.

At 708, the processor aggregates the ride quality feedback data from the passengers and the driving data from the autonomous vehicle. At 710, roadway information is supplemented with the aggregated ride quality feedback data and the aggregated driving data. The roadway information may be stored in a memory associated with the processor. The methodology concludes at 712.

In one embodiment, the driving data further includes at least one of elevation change rates along the at least one roadway, velocity change rates along the at least one roadway, or direction change rates along the at least one roadway.

Figure 8:
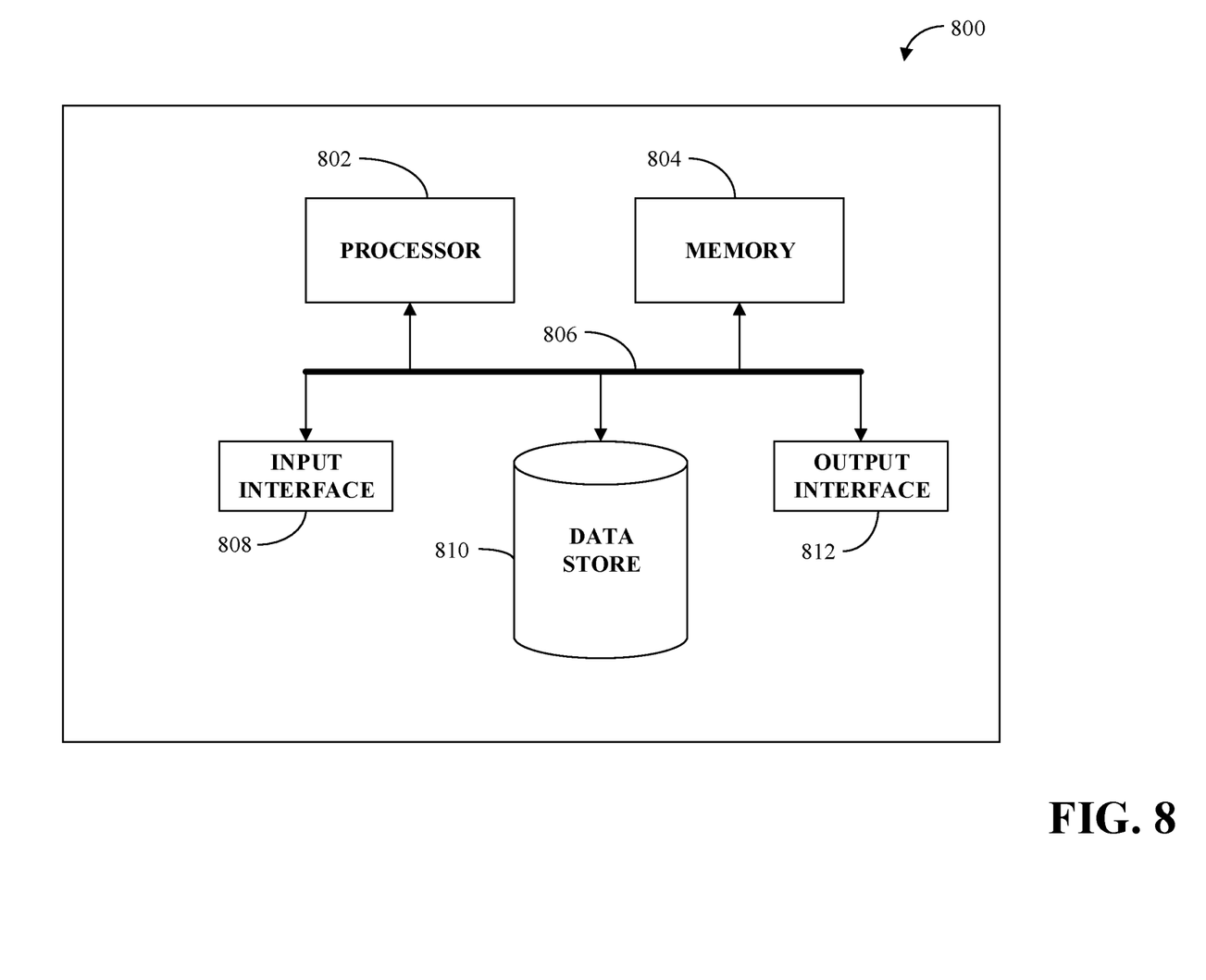
FIG. 8 illustrates an exemplary computing system.

Referring now to FIG. 8, a high-level illustration of an exemplary computing device 800 that can be used in accordance with the systems and methodologies disclosed herein is illustrated. For instance, the computing device 800 may be or include the mobile computing device 128. According to another example, the computing device 800 may be or include the computing system 116. Pursuant to another example, the server computing system 130 may be or include the computing device 800. The computing device 800 includes at least one processor 802 that executes instructions that are stored in a memory 804. The instructions may be, for instance, instructions for implementing functionality described as being carried out by one or more components discussed above or instructions for implementing one or more methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store geolocation coordinates of suggested locations or landmarks, roadways, user identification, user preferences, etc.

The computing device 800 additionally includes a data store 810 that is accessible by the processor 802 by way of the system bus 806. The data store 810 may include executable instructions, geolocation coordinates of suggested locations or landmarks, roadways, user identification, user preferences, etc. The computing device 800 also includes an input interface 808 that allows external devices to communicate with the computing device 800. For instance, the input interface 808 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
a vehicle propulsion system;
a braking system;
a steering system;
a computing system that is in communication with the vehicle propulsion system, the braking system, and the steering system, wherein the computing system comprises:
a processor; and
memory that stores computer-executable instructions that, when executed by the processor, cause the processor to perform acts comprising:
selecting a route for a passenger of the autonomous vehicle for a trip to a destination in the autonomous vehicle, the route for the passenger being selected from a plurality of potential routes to the destination, the route for the passenger being selected based on a preference of the passenger and aggregate ride quality feedback from passengers of autonomous vehicles in a fleet assigned to locations along the potential routes to the destination, wherein the preference of the passenger is to select the route as a function of ease of at least one of entering or exiting the autonomous vehicle, wherein the aggregate ride quality feedback from the passengers of the autonomous vehicles in the fleet assigned to the locations along the potential routes comprises ease data concerning entering the autonomous vehicles in the fleet at pick-up locations and exiting the autonomous vehicles in the fleet at destinations reported by the passengers of the autonomous vehicles in the fleet at the locations, and wherein the autonomous vehicle is in the fleet; and
controlling at least one of the vehicle propulsion system, the braking system, or the steering system to move the autonomous vehicle along the route as selected for the trip to the destination.

2. The autonomous vehicle of claim 1, the route for the passenger further being selected based on elevation change rates along the potential routes.

3. The autonomous vehicle of claim 1, the route for the passenger further being selected based on velocity change rates along the potential routes.

4. The autonomous vehicle of claim 1, the route for the passenger further being selected based on direction change rates along the potential routes.

5. The autonomous vehicle of claim 1, wherein the preference of the passenger is to select the route as a function of ride comfort.

6. The autonomous vehicle of claim 1, wherein:
the preference of the passenger is further to select the route as a function of scenery; and
the aggregate ride quality feedback from the passengers of the autonomous vehicles in the fleet assigned to the locations along the potential routes further comprises data specifying scenic positions reported by the passengers of the autonomous vehicles in the fleet at the locations.

7. The autonomous vehicle of claim 1, the memory further stores computer-executable instructions that, when executed by the processor, cause the processor to perform acts including:
receiving user input specifying the preference of the passenger;
wherein the route for the passenger is selected responsive to receipt of the user input specifying the preference of the passenger.

8. The autonomous vehicle of claim 7, wherein the user input specifying the preference of the passenger comprises a route change request, wherein the route change request signifies discomfort of the passenger of the autonomous vehicle as the autonomous vehicle traverses a selected route, wherein selecting the route for the passenger comprises:
switching from the selected route for the passenger of the autonomous vehicle for the trip to the destination to the route selected in response to receipt of the route change request.

9. The autonomous vehicle of claim 7, wherein the user input specifying the preference of the passenger comprises selection of a route suggested by a third party, wherein the suggested route comprises a location suggested by the third party along the suggested route.

10. The autonomous vehicle of claim 7, wherein the user input specifying the preference of the passenger comprises selection of a destination suggested by a third party.

11. The autonomous vehicle of claim 1, wherein the aggregate ride quality feedback further comprises at least first ride comfort data provided by a subset of the passengers of the autonomous vehicles signifying experienced discomfort at a first location and second ride comfort data provided by a second subset of the passengers of the autonomous vehicles signifying experienced discomfort at a second location, wherein the discomfort experienced at the first location comprises motion sickness, wherein the discomfort experienced at the second location comprises motion sickness.

12. A method of controlling routing of an autonomous vehicle to a destination comprising:
  selecting a route for a passenger of the autonomous vehicle for a trip to the destination in the autonomous vehicle, the route for the passenger being selected from a plurality of potential routes to the destination, the route for the passenger being selected based on:
    a preference of the passenger, wherein the preference of the passenger is to select a route as a function of sponsor subsidization of a trip cost for a sponsored route;
    aggregate ride quality feedback from passengers of autonomous vehicles in a fleet assigned to locations along the potential routes to the destination, wherein the aggregate ride quality feedback comprises at least first ride comfort data provided by a subset of the passengers of the autonomous vehicles signifying experienced discomfort at a first location and second ride comfort data provided by a second subset of the passengers of the autonomous vehicles signifying experienced discomfort at a second location, wherein the autonomous vehicle is in the fleet; and
    at least one of elevation change rates along the potential routes, velocity change rates along the potential routes, or direction change rates along the potential routes; and
  controlling at least one of a vehicle propulsion system, a braking system, or a steering system to move the autonomous vehicle along the route as selected for the trip to the destination.

13. The method of claim 12, wherein the route is further selected based on a number of direction changes above a threshold degree of directional change along the potential routes.

14. The method of claim 12, wherein the route is further selected based on a number of elevation changes above a threshold elevation change along the potential routes.

15. The method of claim 12, wherein the preference of the passenger is further to select a route as a function of scenery, wherein the aggregate ride quality feedback from the passengers of the autonomous vehicles in the fleet assigned to the locations along the potential routes to the destination further comprises data specifying scenic locations reported by the passengers of the autonomous vehicles in the fleet at the locations.

16. The method of claim 12, further comprising:
  receiving user input specifying the preference of the passenger, wherein the user input specifying the preference of the passenger comprises a route change request, wherein the route change request signifies discomfort of the passenger of the autonomous vehicle as the autonomous vehicle traverses a selected route, wherein selecting the route for the passenger comprises:
    switching from the selected route for the passenger of the autonomous vehicle for the trip to the destination to the route selected in response to receipt of the route change request.

17. The method of claim 12, wherein the discomfort experienced at the first location comprises motion sickness, wherein the discomfort experienced at the second location comprises motion sickness.

18. A method for generating a supplement to roadway information, comprising:
  receiving, at a processor, ride quality feedback data from passengers of a fleet of autonomous vehicles as the autonomous vehicles traverse at least one roadway, wherein the ride quality feedback data corresponds to locations as the autonomous vehicles traverse the at least one roadway, wherein the ride quality feedback data comprises:
    at least first ride comfort data provided by a subset of the passengers of the autonomous vehicles signifying experienced discomfort at a first location along the at least one roadway and second ride comfort data provided by a second subset of the passengers of the autonomous vehicles signifying experienced discomfort at a second location along the at least one roadway; and
    ease data concerning entering the autonomous vehicles in the fleet at pick-up locations and exiting the autonomous vehicles in the fleet at destinations reported by the passengers of the autonomous vehicles in the fleet at the locations;
  receiving, at the processor, driving data from the fleet of the autonomous vehicles as the autonomous vehicles traverse the at least one roadway, wherein the driving data specifies current states of the autonomous vehicles at times corresponding to when the ride quality feedback data is provided;
  aggregating, by the processor, the ride quality feedback data from the passengers and the driving data from the autonomous vehicles; and
  supplementing roadway information with the aggregated ride quality feedback data at the locations and the aggregated driving data, wherein the aggregated ride quality feedback data is assigned to the locations in the roadway information based on the aggregated driving data, wherein the roadway information is stored in a memory associated with the processor.

19. The method of claim 18, wherein the driving data further comprises at least one of elevation change rates along the at least one roadway, velocity change rates along the at least one roadway, or direction change rates along the at least one roadway.

20. The method of claim 18, further comprising:
  transmitting, by the processor, an alert to the passengers, wherein the alert is configured to request ride quality feedback data from at least one passenger.

* * * * *